US009497498B2

(12) United States Patent
Hain (10) Patent No.: US 9,497,498 B2
(45) Date of Patent: Nov. 15, 2016

(54) SYSTEM AND METHOD FOR LIVE STREAMING OF CONTENT

(71) Applicant: Robert Hain, Limassol (CY)

(72) Inventor: Robert Hain, Limassol (CY)

(*) Notice: Subject to any disclaimer, the term of this patent is extended or adjusted under 35 U.S.C. 154(b) by 0 days.

(21) Appl. No.: 14/947,783

(22) Filed: Nov. 20, 2015

(65) Prior Publication Data
US 2016/0219320 A1    Jul. 28, 2016

Related U.S. Application Data

(60) Provisional application No. 62/106,984, filed on Jan. 23, 2015.

(51) Int. Cl.
| H04N 21/23 | (2011.01) |
|---|---|
| H04N 21/2662 | (2011.01) |
| H04L 29/06 | (2006.01) |
| H04L 12/26 | (2006.01) |
| H04N 21/2187 | (2011.01) |
| H04N 21/24 | (2011.01) |
| H04N 21/234 | (2011.01) |
| H04N 21/81 | (2011.01) |
| H04N 21/262 | (2011.01) |
| H04N 21/2543 | (2011.01) |

(52) U.S. Cl.
CPC ...... *H04N 21/2662* (2013.01); *H04L 43/0882* (2013.01); *H04L 65/607* (2013.01); *H04N 21/2187* (2013.01); *H04N 21/23424* (2013.01); *H04N 21/2402* (2013.01); *H04N 21/2543* (2013.01); *H04N 21/26225* (2013.01); *H04N 21/812* (2013.01)

(58) Field of Classification Search
None
See application file for complete search history.

(56) References Cited

U.S. PATENT DOCUMENTS

| 6,981,040 | B1* | 12/2005 | Konig | G06F 17/30867 707/E17.109 |
|---|---|---|---|---|
| 2002/0083445 | A1* | 6/2002 | Flickinger | G06Q 30/02 725/35 |
| 2003/0055917 | A1* | 3/2003 | Boreham | G06Q 30/06 709/220 |
| 2003/0055971 | A1* | 3/2003 | Menon | H04L 67/1008 709/226 |
| 2007/0039028 | A1* | 2/2007 | Bar | H04N 21/23439 725/95 |
| 2008/0092182 | A1* | 4/2008 | Conant | H04N 7/17318 725/109 |
| 2011/0083144 | A1* | 4/2011 | Bocharov | H04N 7/17318 725/32 |
| 2011/0088069 | A1* | 4/2011 | Igarashi | H04N 21/2381 725/95 |

* cited by examiner

*Primary Examiner* — Cai Chen
(74) *Attorney, Agent, or Firm* — James M. Smedley LLC; James Michael Smedley, Esq.

(57) ABSTRACT

Embodiments of the present invention are generally directed towards systems and methods for generating and streaming live content. Specifically, embodiments of the present invention provide systems and methods for recording and encoding content on a single system prior to transmitting the encoded content to a content delivery network (CDN) via a network for consumption by remote end users. Further embodiments of the present invention are configured to allow for the provision of multiple encoded content streams, wherein the content streams are provided to users based on subscription type, with certain subscription types receiving varying content types (e.g., advertisements, premium content) based on the subscription type.

16 Claims, 6 Drawing Sheets

SYSTEM AND METHOD FOR LIVE STREAMING OF CONTENT

CROSS-REFERENCE TO RELATED APPLICATIONS

This application claims the benefit of U.S. Provisional Patent Application No. 62/106,984, filed Jan. 23, 2015, the entire disclosure of which is incorporated herein by reference.

FIELD OF THE INVENTION

Embodiments of the present invention are generally directed towards systems and methods for generating and streaming live content. Specifically, embodiments of the present invention provide systems and methods for recording and encoding content on a single system prior to transmitting the encoded content to a content delivery network (CDN) via a network for consumption by remote end users. Further embodiments of the present invention are configured to allow for the provision of multiple encoded content streams, wherein the content streams are provided to users based on subscription type, with certain subscription types receiving varying content types (e.g., advertisements, premium content) based on the subscription type.

BACKGROUND

Providing live broadcasts of content over a network, such as the Internet, is generally done in a very formulaic manner currently. Broadcasters record content via a third-party software application which transmits streaming content to a streaming server farm which takes the streamed content and transcodes it into various bit rates. The encoded content is then transmitted to a content delivery network (CDN) for provision to a plurality of end users via a streaming client.

Several problems exists with this model, including latency issues, lack of control over content, loss of quality and inability to provide content in high resolution formats and/or higher frame rates for live broadcast video content. Part of the issue is that video content must first be encoded before transmission to a streaming server farm for transcoding into the various bit rates.

This extra work introduces delays in time between the live broadcast and eventual delivery to the end user. Given the number of steps and the tack of control over processing, broadcasting delays are almost a guarantee in prior art systems, with average latency between live content and consumption by a consumer being in the range of 30-60 seconds. Similarly, buffering in prior art systems is in the order of 6-10 seconds per minute of content.

Therefore, there is need in the art for systems and methods for recording and encoding content in such a manner that the encoded content can be transmitted to a content delivery network (CDN) via a network for consumption by remote end users, wherein the encoded content does not suffer from the aforementioned issues. These and other features and advantages of the present invention will be explained and will become obvious to one skilled in the art through the summary of the invention that follows.

SUMMARY OF THE INVENTION

Accordingly, it is an aspect of the present invention to provide system and methods for recording and encoding content in such a manner that the encoded content can be transmitted to a content delivery network (CDN) via a network for consumption by remote end users, wherein the encoded content is capable of being provided: (i) without latency issues, (ii) in various resolutions and/or bit rates, including high resolution formats 1080p at 60 frames per second, 4 k at 24 frames per second), and (iii) with control over content being retained by operators of the system (e.g., advertising content, premium content).

According to an embodiment of the present invention, a content live streaming platform is configured to allow for recording and encoding content and configured to transmit encoded content to a remote content delivery network for provision to a plurality of end users.

According to an embodiment of the present invention, the content is encoded in a plurality of bit rates and provided to said remote content delivery network in said plurality of bit rates.

According to an embodiment of the present invention, the content includes advertising content, wherein insertion of said advertising content is controlled via said content live streaming platform.

According to an embodiment of the present invention, the content live streaming platform distinguishes users based on subscription type: wherein said encoded content comprises a plurality of content stream types, and wherein provision of a content stream type is selected from said plurality of content stream types based on said subscription type.

According to an embodiment of the present invention, a content live streaming platform for recording and encoding content and configured to transmit encoded content to a remote content delivery network for provision to a plurality of end users, comprises: a microprocessor; a non-volatile computer-readable memory; a data communications interface; and circuitry for receiving recorded content, wherein the non-volatile computer-readable memory is communicatively connected to said processor, data communications interface and circuitry for receiving recorded content and is configured with computer instructions configured to: receive event content, via said circuitry for receiving recorded content; determine, in conjunction with said microprocessor and data communications interface, one or more encoding bit rates based at least in part on a connection between said data communications interface and a content distribution network; encode, via said microprocessor, said event content in said one or more encoding bit rates; and transmit encoded content, via said data communications interface, to said content distribution network.

According to an embodiment of the present invention, the non-volatile computer-readable memory, processor, data communications interface and circuitry for receiving recorded content are further configured with computer instructions configured to: connect to said content delivery network; transmit test data to said content delivery network; analyze available bandwidth between said content live streaming platform and said content delivery network based at least in part on said transmission of test data; and utilize available bandwidth analysis in determining said one or more encoding bit rates.

According to an embodiment of the present invention, the non-volatile computer-readable memory, processor, data communications interface and circuitry for receiving recorded content are further configured with computer instructions configured to: analyze connection quality of said connection between said data communications interface and said content distribution network based at least in part on packet data received in response to said transmission of test data; and utilize connection quality analysis in determining said one or more encoding bit rates.

According to an embodiment of the present invention, at least one of the one or more encoding bit rates comprises at least one bit rate at or greater than 500 kbps.

According to an embodiment of the present invention, at least one of the one or more encoding bit rates comprises at least one bit rate at or below 1200 kbps.

According to an embodiment of the present invention, at least one of the one or more encoding bit rate comprises at least one bit rate at or below 500 kbps and at least one of the one bit rate at or greater than 1200 kbps.

According to an embodiment of the present invention, the encoded content includes advertising content, wherein insertion of said advertising content is controlled via said content live streaming platform.

According to an embodiment of the present invention, the non-volatile computer-readable memory, processor, data communications interface and circuitry for receiving recorded content are further configured with computer instructions configured to: identify a natural break event in said event content; and insert said advertising content at said natural break event in said event content.

According to an embodiment of the present invention, the encoded content includes one or more start triggers that identify a location in the encoded content where the content distribution network may insert advertising content and one or more stop triggers that identify a location in the encoded content where the content distribution network will stop inserting advertising content and resume distribution of the encoded content, and the start triggers and the stop triggers are inserted into said encoded content via said content live streaming platform.

According to an embodiment of the present invention, the non-volatile computer-readable memory, processor, data communications interface and circuitry for receiving recorded content are further configured with computer instructions configured to: distinguish users based on subscription type, wherein said encoded content comprises a plurality of content stream types; and provide users access to a content stream type selected from said plurality of content stream types based on said subscription type.

According to an embodiment of the present invention, a method for providing recording and encoding of event content and transmission of encoded content to a remote content delivery network for provision to a plurality of end users, comprises the steps of: receiving event content, via a circuitry for receiving recorded content; determining, in conjunction with a microprocessor and data communications interface, one or more encoding bit rates based at least in part on a connection between said data communications interface and a content distribution network; encoding, via said microprocessor, said event content in said one or more encoding bit rates; and transmitting encoded content, via said data communications interface, to said content distribution network.

According to an embodiment of the present invention, the method further comprises the steps of: connecting to said content delivery network; transmitting test data to said content delivery network; analyzing available bandwidth between said content live streaming platform and said content delivery network based at least in part on said transmission of test data; and utilizing available bandwidth analysis in determining said one or more encoding bit rates.

According to an embodiment of the present invention, the method further comprises the steps of: Analyzing connection quality of said connection between said data communications interface and said content distribution network based at least in part on packet data received in response to said transmission of test data; and utilizing connection quality analysis in determining said one or more encoding bit rates.

According to an embodiment of the present invention, the method further comprises the steps of: identifying a natural break event in said event content; and inserting said advertising content at said natural break event in said event content.

According to an embodiment of the present invention, the method further comprises the steps of: distinguishing users based on subscription type, wherein said encoded content comprises a plurality of content stream types; and providing users access to a content stream type selected from said plurality of content stream types based on said subscription type.

DETAILED SPECIFICATION

Embodiments of the present invention are generally directed towards systems and methods for generating and streaming live content. Specifically, embodiments of the present invention provide systems and methods for recording and encoding content on a single system prior to transmitting the encoded content to a content delivery network (CDN) via, a network for consumption by remote end users. Further embodiments of the present invention are configured to allow for the provision of multiple encoded content streams, wherein the content streams are provided to users based on subscription type, with certain subscription types receiving varying content types (e.g., advertisements, premium content) based on the subscription type.

Content Processing

Figure 2:
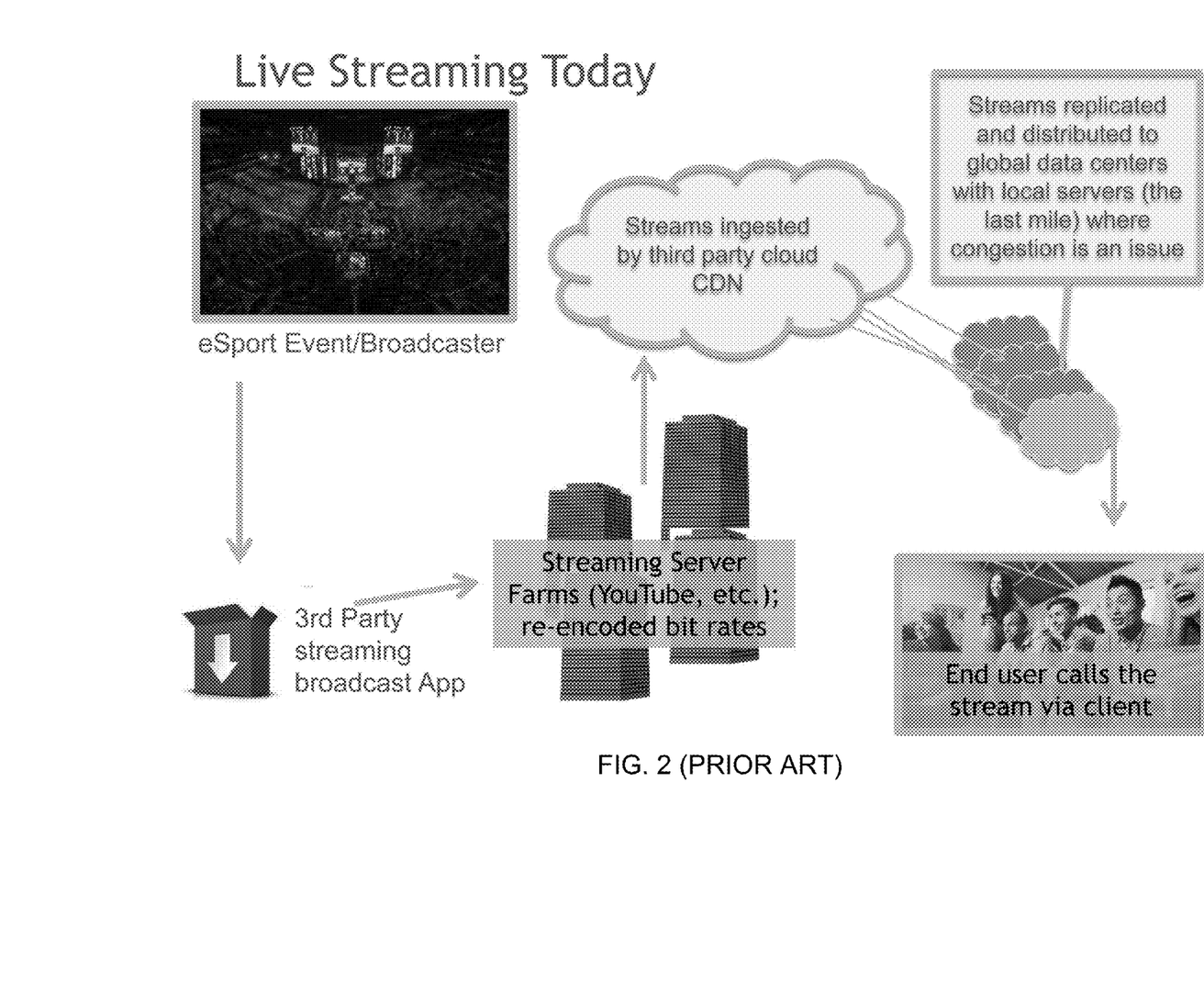
FIG. 2 is an illustration of live streaming of content as conducted in the prior art.

Turning first to FIG. 2, a diagram of how current live streaming is accomplished in the prior art is shown. In most cases, live content is recorded via a streaming application provided by a third party. The application utilizes local hardware (e.g., video camera(s), microphone(s), laptop, desktop computing device, smartphone) or other hardware communicatively connected to the application or system (e.g., audio/visual system attached to application via an input means, such as USB ports, HDMI ports, optical ports, analog ports) to capture content (e.g., video, audio) and transmit the recorded content to a streaming server. At the streaming server, the content is transcoded into various bit rates so that consumers of various network bandwidths can consume the content in a resolution that is capable of being consumed without constant interruption (e.g., buffering, stuttering, pauses). Once encoded in the various bit rates, the streaming server will provide the content in the various bit rates to a CDN. The CDN then replicates the streams and distributes them to global data centers for provision to users based on location or other parameters. Finally, the content is provided to the end user for consumption.

Figure 3:
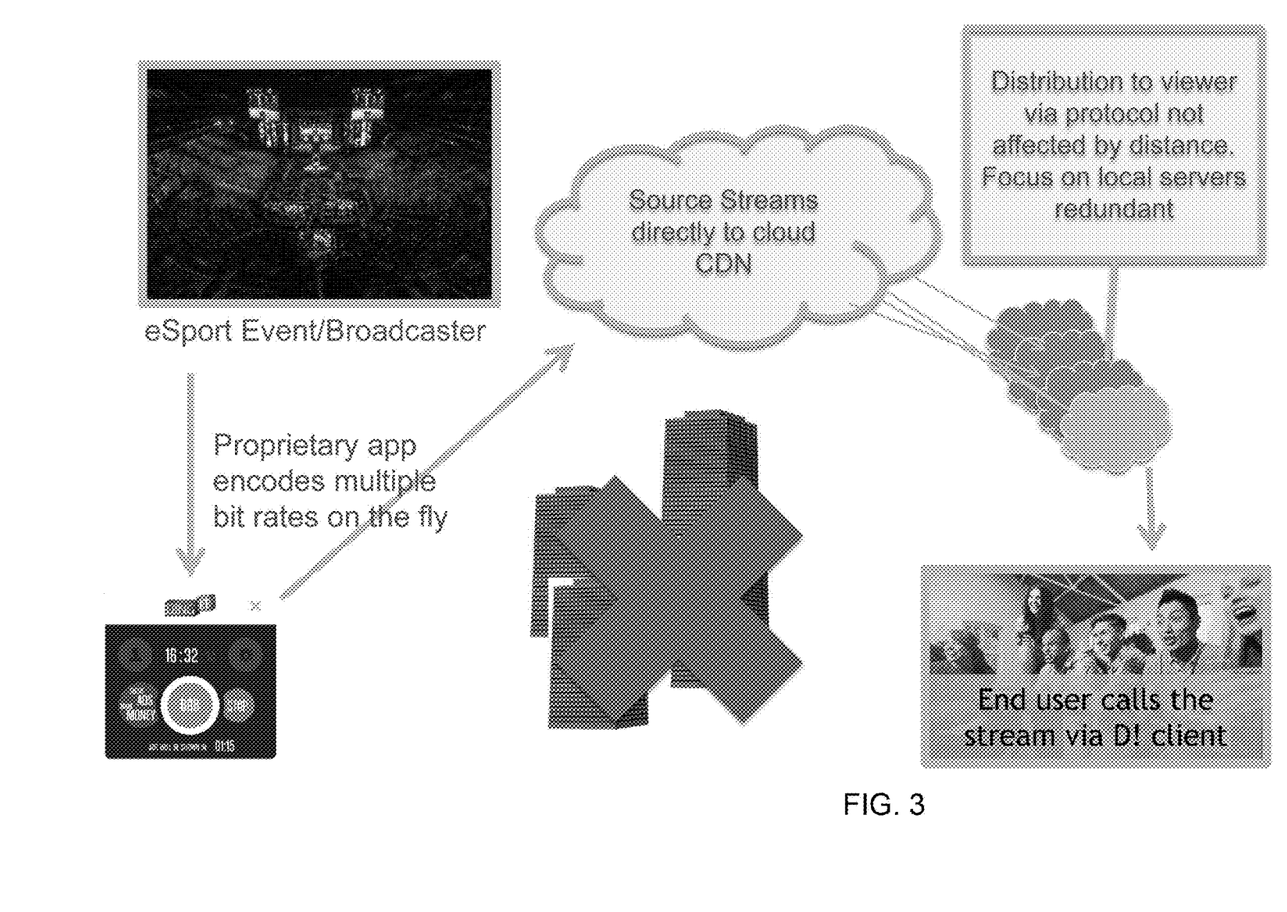
FIG. 3 is an illustration of a method for generating and streaming live content, in accordance with an embodiment of the present invention.
Figure 4:
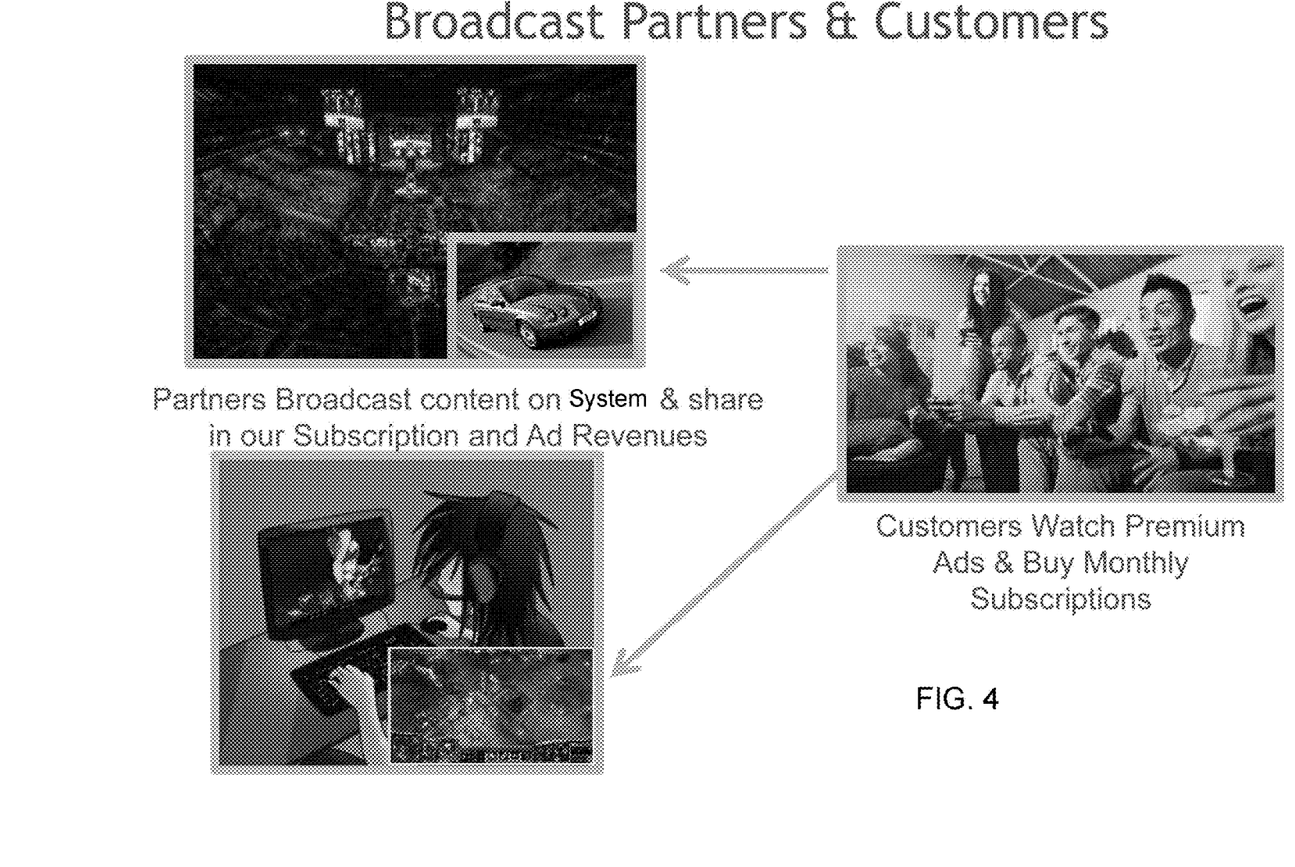
FIG. 4 is an illustration of a method for utilization of the system via broadcasters, partners and customers, in accordance with an embodiment of the present invention.

Turning now to FIG. 3, an exemplary embodiment of the present invention is shown with respect to a system for live streaming of content is shown that overcomes the limitations of the current state of the art. In this system, a broadcaster at an event utilizes hardware to capture content of the event, such as video cameras, microphones or other visual/audio equipment, and feeds that content into a client side system (e.g., onsite system), comprising a combination of content processing hardware and software configured to process and encode multiple content bit rates in real time or near real time (i.e., on the fly). As the content is encoded it can be provided in the plurality of bit rates to the CDN without needing any intermediary for processing.

Certain embodiments of the system may also be configured to analyze bandwidth availability and reliability between the client side system and the CDN to determine the number and type of encoded content bit rates to send. Advantageously, not only does this ensure that the transmission of encoded content is effected in accordance with available resources, but also works to reduce the processing load and ultimately processing time experienced by the client side system as the client side system will only encode the bit rates needed for transmission to the CDN based on the determination of the bandwidth availability and reliability identified by the system.

In preferred embodiments of the present invention, distribution of the encoded content to end users in the appropriate bit rates is done via a Real Time Messaging Protocol (RTMP) over User Datagram Protocol (UDP) protocol not affected by distance, making focus on local servers redundant. In another embodiment, distribution of the encoded content to end users may be done by way of HTTP Live Streaming (HLS). In conjunction with and after exposure to the disclosure herein, one of ordinary skill in the art would appreciate that there are other protocols that could be substituted to provide encoded content to end users, and such embodiments are within the contemplated scope of the present invention.

In these preferred embodiments, by processing and encoding content in this manner, and providing the encoded content directly to the CDN and then via the CDN to the end user via the RTMP over UDP protocol, live broadcasting can be achieved with an average latency between 1-6 seconds and buffering reduced to 0.2-1 seconds per minute of content. Sending encoded content from the CDN over UDP over RTMP increases transfer rates and lowers bandwidth requirements as the protocol does not try to resend frames not received by individual end users and the UDP protocol uses a bit less protocol data than other protocols commonly used by CDNs (e.g., Transmission Control Protocol (TCP)). Multicasting technology further helps to make delivery of the encoded content from the CDN to the end users faster.

Further, the client side processing and encoding of the content allows for provision of content at improved resolutions and framerates. Prior art systems can only achieve 720p resolution at 60 frames per second. Embodiments of the present invention can achieve 1080p at 60 frames or greater per second and 4 k content at 24 frames or greater per second. Further, as resolutions increase and hardware, such as processing units, get more powerful, increased resolutions and frame rates may be provided through use of embodiments of the present invention as well.

Figure 1:
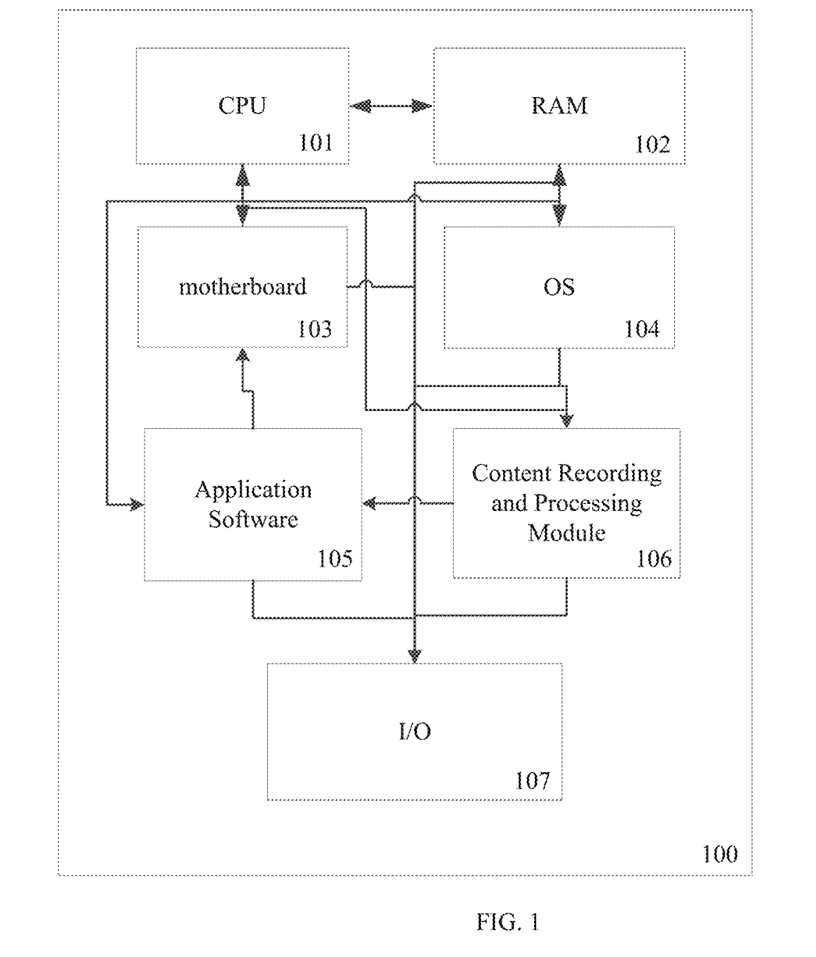
FIG. 1 illustrates a schematic overview of a computing device, in accordance with an embodiment of the present invention.

According to an embodiment of the present invention, the system and method is accomplished through the use of one or more computing devices. As shown in FIG. 1, One of ordinary skill in the art would appreciate that a computing device 100 appropriate for use with embodiments of the present application may generally be comprised of one or more of a Central processing Unit (CPU) 101, Random Access Memory (RAM) 102, a storage medium (e.g., hard disk drive, solid state drive, flash memory, cloud storage) 103, an operating system (OS) 104, one or more application software 105, one or more modules configured to record, encode, transmit or otherwise process content (i.e., Content Recording and Processing Module 106) and one or more input/output devices/means 107. Examples of computing devices usable with embodiments of the present invention include, but are not limited to, personal computers, smart phones, laptops, mobile computing devices and tablet PCs and servers. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

Content and Advertising Control

In addition to allowing for the provision of increased quality live streaming content, embodiments of the present invention are also configured to provide better control over advertising and other content interruptions. This is generated by two main features provided in conjunction with the system.

First, the system is able to define users via one or more criteria. In a preferred embodiment of the present invention, the criteria the system defines user on is subscription type. The system may be configured to offer one or more subscription levels to users, allowing for users to be identified by their subscription tier and provided content and advertising based on that subscription level. For instance, the system may provide a free subscription type, whereby content provided to users will contain only a subset of the available content provided by the system and the content may be interrupted more frequently for inclusion of advertisements or other content engagements. Similarly, a premium, or paid, subscription type may allow the system to provide access to premium content and fewer or more directed advertisements.

In certain embodiments of the present invention, the system can be configured to provide a plurality of subscription types, each having a different level of access to content streams and provision of number and nature of advertisements. One of ordinary skill in the art would appreciate that there are numerous types of subscriptions and subscription methodology that could be utilized with embodiments of the present invention, and embodiments of the present invention are contemplated for use with any appropriate subscription methodology and types of subscriptions.

Turing to the second main feature, the system provides for better control over advertising and other content interruptions. The system provides for the directed incorporation of specific advertising content and specific times for the provision of advertising or other content interruptions. This is important since during live broadcasts, there may be natural break points in the provision of content, such as changing between events, end of specific time periods (e.g., rounds in video games, periods or quarters in sports broadcasting). In prior art systems, advertising is provided at specific intervals (e.g., every 30 minutes, at the beginning of streaming content to a user), which generally will not line up with these natural break points. Advantageously, embodiments of the present system are capable of incorporating appropriate content interruptions and/or advertisements at these natural break points.

Additionally, these two features of embodiments of the present invention described above with respect to content and advertising control can be utilized together to enhance the effectiveness of both. For instance, the system can take into account a user's subscription level when determining the type of content to provide during a natural break point. In this case, the system can provide a premium subscriber with premium content (e.g., non-advertising content) related to the live broadcast or the event, such as interviews with event participants, players, or other notable persons, or additional events that occur during the natural break points (e.g., secondary events occurring at an event). Similarly, a free or basic subscriber may be provided with advertising content during the natural break points as opposed to the premium content. Further, free or basic subscribers may be provided advertisements or offers to upgrade to premium subscription levels during these natural break points.

With respect to the incorporation of advertising into the content stream, the system can be configured to handle insertion of advertising in a variety of manners. Firstly, the advertisements may be provided by the system and incorporated upon a natural event break point. For instance, advertisements may be provided by sponsors of the event or otherwise provided by the system for incorporation with any event. In certain embodiments, these advertisements can be pre-encoded so that no additional resources are needed to insert them into the live encoded content. This has the advantage of reducing overhead and processing power requirements.

In another embodiment, advertisements can be provided by the system by the CDN or a third-party advertisement source. In this embodiment, the system would send a signal to the third-party advertisement source to provide an advertisement to one or more users and the third-party advertisement source could send the encoded content directly to the users. Otherwise, the advertisement could be provided to the system and the system could incorporate the advertisement into the appropriate encoded content streams. In these embodiments, advertisement start/stop signals could be sent by an operator of the live event broadcast to delineate the boundaries of the natural break points. In other embodiments, the event operator could set a natural break point time period (e.g., 5 minutes) and the system or third-party advertisement source could provide appropriate advertisements or other content for the specified time period. One of ordinary skill in the art would appreciate that there are numerous methods for delineating the duration or start/stop points for a natural break point, and embodiments of the present invention are contemplated for use with any appropriate methods.

According to an embodiment of the present invention, the advertisement start/stop signals could be implemented via providing relevant triggers at intervals throughout the entire broadcast time of the advertisement. In this manner, those users who join a broadcast stream in the middle of the presentation of an advertisement will still be sent to the advertisement (as opposed to missing a single start trigger and being excluded from the provision of the advertising content). Similarly, stop triggers could be sent for a specified duration after the advertisement ends in order to prevent a loss of packets causing users to remain in an advertisement content stream as opposed to returning to the broadcast stream. In an exemplary embodiment, a series of advertisement start triggers could be sent every second for the entire duration of the provision of an advertisement stream (or some subset thereof). Upon termination of the advertisement, a series of advertisement stop signals could be sent for a period of 10 seconds after the completion of the advertising content. These are just exemplary timing and duration of triggers and one of ordinary skill in the art would appreciate that timing of signals and duration could occur with greater or lesser intervals and greater or lesser durations.

EXEMPLARY EMBODIMENT

Figure 5:
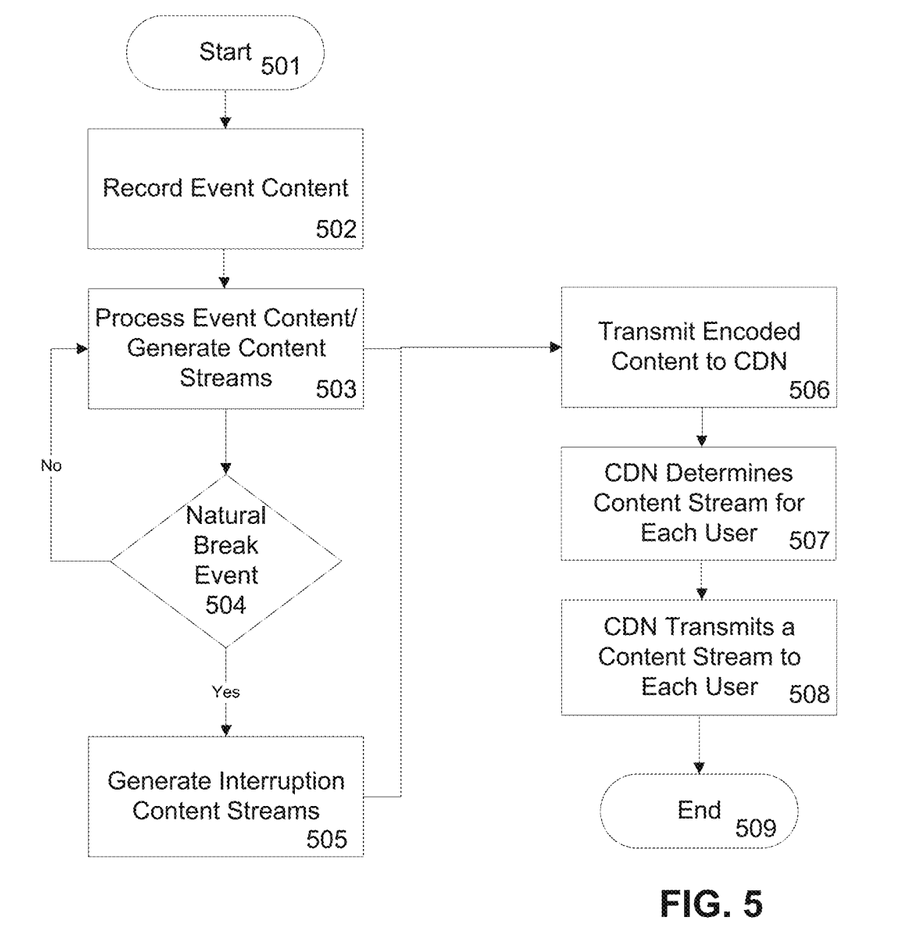
FIG. 5 is a process flow for a method for generating and streaming live content, in accordance with an embodiment of the present invention.

The following is an exemplary embodiment of the present invention. Turning now to FIG. 5, a method of utilizing the system described herein is shown. The process starts at step 501 with the system being engaged for the recording, encoding and provision of a live streaming broadcast. At step 502, the system begins to record or otherwise receive recorded content from the event. As noted above, this could be any combination of audio/visual content types or other content types.

At step 503, the system begins to process and encode the live streaming content into appropriate bit rates. In certain embodiments, the operator of the system can select which bit rates to provide. In other embodiments, the system may automatically select bit rates for encoding. An exemplary method for determining bit rates for encoding is shown in FIG. 6 and may be utilized in this point of the exemplary process detailed in FIG. 5 or as a standalone process or otherwise implemented at a different time or place within the process.

Figure 6:
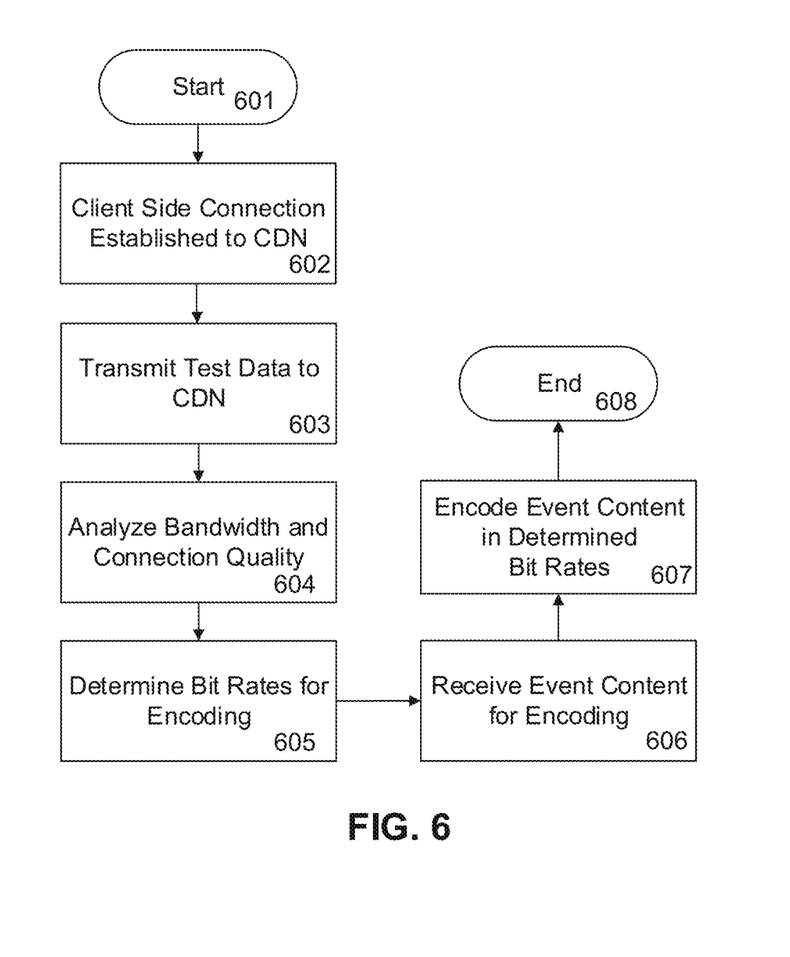
FIG. 6 is a process flow for a method for generating and streaming live content, in accordance with an embodiment of the present invention.

In the exemplary process for selecting bit rates and encoding content, shown in FIG. 6, the process starts at step 601 with the system being engaged for encoding event content. At step 602, the client side system connects to one or more CDNs which will receive encoded content from the client side system. Connection parameters may be encoded in the client side system or provided manually or automatically to the system, such as via user input or via a connection with a stored or remote module, data store or system containing connection information for the one or more CDNs that will be used to transmit the content to users once the encoded content is received from the client side system.

At step 603, the client side system begins testing the connection between the client side system and the CDN. In this preferred embodiment, the connection quality is established via sending test data to the CDN, such as one or more files or other data types (e.g., packets) of known size. In general the size of the one or more files or data types should be sufficient to allow for the test to occur over a period of time. The greater the period of time the test data takes to transmit, the more accurate the eventual analysis of the bandwidth and connection quality will be, given that brief tests may not encounter noise or other issues that occur intermittently in a connection.

After the data is transmitted, the client side system will analyze the transmission data to determine the available bandwidth and connection quality (step 604). This can be done, for instance, by determining how long it took to transmit the one or more files or data types of known size and packet data associated with the transmission. Further, since file transmission under many transmission protocols (e.g., TCP) include error checking for missing or damaged packets of data, the client side system can also use this information to determine the quality of the connection, with higher packet loss being a sign that the connection quality may be compromised.

Once the bandwidth and connection quality are determined, the system will then determine what bit rates to encode the content in, based on the available bandwidth and connection quality (step 605). In preferred embodiments, the client side system will determine a number and type of bit rates to encode such that a connection with the CDN is not fully saturated by the transmission of encoded content to the CDN. This allows for some flexibility as even with bandwidth and connection testing, connections can vary as demands change over time. Further, in preferred embodiments, where the connection between the client side system and CDN allows, the client side system will attempt to provide a mix of high bit rate encoded content (e.g., HD 1080p @ H.264 high profile 5000 kbps, HD 1080p @ H.264 high profile 3000 kbps, HD720p @ H.264 high profile 2000 kbps,), standard bit rate encoded content (e.g., SD 480p @ H.264 main profile 1200 kbps) and low bit rate encoded content (e.g., LD 360p @ H.264 main profile, 700 kbps, LD 360p @ H.264 main profile, 500 kbps, LD 240p @ H.264 baseline profile 350 kbps). In this manner, even where broad and stable connections are available, the client side system will provide some low bit rate encoded content as not every end user will also have a broad and stable connection and may rely on receiving lower bit rate encoded content in order to enjoy a smooth streaming experience.

At step 606, after determining what bit rates the client side system will be encoding content in, the client side system can begin receiving event content for encoding (step 606). As noted herein, the event content can be received in a variety of manners from a variety of input means and sources. Once received, the client side system will begin to encode the event content in the determined bit rates (step 607) and at which point the process will return to the exemplary process detailed in FIG. 5.

Returning to FIG. 5, at step 504, during the recording and encoding of the event content for transmission to the CDN, the system may continually check to see if there is a natural break event. Generally, the occurrence of a natural break event is initiated by an operator of the system at specific points in the event, such as switching between games or ending of rounds or other time periods. In certain embodiments, the system can detect natural break events by monitoring event conditions, including by way of, but not limited to: detecting the absence of keyboard/key press events, detecting no screen redrawing, detecting no mouse events over a period of time, detecting lack of movement/motion from webcam, or any combination thereof. If no natural break event is detected, the system continues with the uninterrupted processing and encoding of the live broadcast stream. If a natural break event is detected, the system, at step 505 signals the processing and encoding of live broadcast stream to insert appropriate advertising or other interruption content (e.g., premium subscriber content). In certain embodiments, this interruption does not terminate the recording and/or processing/encoding of live broadcast content, but rather interrupts the provision of that content to the CDN. In still further embodiments, the interruption of content is not provided to all users (e.g., exclude premium users) and instead the live broadcast stream continues or other content is provided to those other users. What content is provided can be based on one or more factors, such as user subscription level (e.g., platinum, gold, silver), user settings (e.g., preferences as to what interruption or other content user prefers), system settings (e.g., selecting available content streams and interruption content based on event type or other configuration elements) or any combination thereof.

At step 506, and generally in line with steps 503 and 505, the system transmits encoded content to the CDN. As detailed herein, the encoded content can comprise multiple content streams of various bit rates, resolutions and frame rates.

At step 507, the CDN determines appropriate content stream for each user requesting provision of the live broadcast content. In certain embodiments, users may need to connect to the CDN or the system in order to provide login, registration or other relevant details to identify the user or permit access to the user to various content levels. One of ordinary skill in the art would appreciate that there are numerous methods for providing and processing this login and registration information, and embodiments of the present invention are contemplated for use with any appropriate type of login and/or registration methodology.

At step 508, the CDN transmits an appropriate content stream to each user based on the user type and details of the network connection between the user and the CDN (e.g., bandwidth and latency). At this point, the process terminates at step 509. Termination may occur due to the termination of the content stream by either the user or the system (e.g., end of a live broadcast event).

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

According to an embodiment of the present invention, a data store may be comprised of one or more of a database, file storage system, relational data storage system or any other data system or structure configured to store data, preferably in a relational manner. In a preferred embodiment of the present invention, the data store may be a relational database, working in conjunction with a relational database management system (RDBMS) for receiving, processing and storing data. In the preferred embodiment, the data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, PHP, ActionScript, C#, .NET, Visual Basic, HTML, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures (including use of central processing units (CPUs), graphical processing units (GPUs) or any combination thereof), and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

What is claimed is:

1. A content live streaming platform for recording and encoding content and configured to transmit encoded content to a remote content delivery network for provision to a plurality of end users, said content live streaming platform comprising:
   a microprocessor;
   a non-volatile computer-readable memory;
   a data communications interface; and
   circuitry for receiving recorded content,
   wherein the non-volatile computer-readable memory is communicatively connected to said processor, data communications interface and circuitry for receiving recorded content and is configured with computer instructions configured to:
   receive event content, via said circuitry for receiving recorded content;
   connect to said content delivery network;
   transmit test data to said content delivery network;
   analyze available bandwidth between said content live streaming platform and said content delivery network based at least in part on said transmission of test data;
   analyze connection quality of said connection between said data communications interface and said content distribution network based at least in part on packet data received in response to said transmission of test data;
   determine a saturation threshold of said connection based on the connection quality and the available bandwidth of said connection, wherein the saturation threshold is equal to the difference between the available bandwidth and the predicted reduction in bandwidth caused by a decrease in connection quality over time;
   determine, in conjunction with said microprocessor and data communications interface, one or more encoding bit rates based at least in part on the available bandwidth and the connection quality of said connection;
   encode, via said microprocessor, said event content in said one or more encoding bit rates, wherein said encoded content does not exceed said saturation threshold; and
   transmit encoded content, via said data communications interface, to said content distribution network.

2. The content live streaming platform of claim 1, wherein said one or more encoding bit rates comprises at least one bit rate at or greater than 5000 kbps.

3. The content live streaming platform of claim 1, wherein said one or more encoding bit rates comprises at least one bit rate at or below 1200 kbps.

4. The content live streaming platform of claim 1, wherein said one or more encoding bit rate comprises at least one bit rate at or below 1200 kbps and one bit rate at or greater than 5000 kbps.

5. The content live streaming platform of claim 1, wherein said encoded content includes advertising content, wherein insertion of said advertising content is controlled via said content live streaming platform.

6. The content live streaming platform of claim 1, wherein the non-volatile computer-readable memory, processor, data communications interface and circuitry for receiving recorded content are further configured with computer instructions configured to:
   identify a natural break event in said event content; and
   insert said advertising content at said natural break event in said event content.

7. The content live streaming platform of claim 1:
   the encoded content includes one or more start triggers that identify a location in the encoded content where the content distribution network may insert advertising content and one or more stop triggers that identify a location in the encoded content where the content distribution network will stop inserting advertising content and resume distribution of the encoded content, and the start triggers, and
   wherein the stop triggers are inserted into said encoded content via said content live streaming platform.

8. The content live streaming platform of claim 1, wherein the non-volatile computer-readable memory, processor, data communications interface and circuitry for receiving recorded content are further configured with computer instructions configured to:
   distinguish users based on subscription type,
   wherein said encoded content comprises a plurality of content stream types; and
   provide users access to a content stream type selected from said plurality of content stream types based on said subscription type.

9. A method for providing recording and encoding of went content and transmission of encoded content from a content live streaming platform to a remote content delivery network for provision to a plurality of end users, said method comprising the steps of:
   receiving event content, via a circuitry for receiving recorded content;
   connecting to said content delivery network;
   transmitting test data to said content delivery network;
   analyzing available bandwidth between said content live streaming platform and said content delivery network based at least in part on said transmission of test data;
   analyzing connection quality of said connection between said data communications interface and said content distribution network based at least in part on packet data received in response to said transmission of test data;
   determining a saturation threshold of said connection based on the connection quality and the available bandwidth of said connection, wherein the saturation threshold is equal to the difference between the available bandwidth and the predicted reduction in bandwidth caused by a decrease in connection quality over time;
   determining, in conjunction with a microprocessor and data communications interface, one or more encoding bit rates based at least in part on the available bandwidth and the connection quality of said connection;
   encoding, via said microprocessor, said event content in said one or more encoding bit rates, wherein said encoded content does not exceed said saturation threshold; and
   transmitting encoded content, via said data communications interface, to said content distribution network.

10. The method of claim 9, wherein said one or more encoding bit rates comprises at least one bit rate at or greater than 2000 kbps.

11. The method of claim 9, wherein said one or more encoding bit rates comprises at least one bit rate at or below 1200 kbps.

12. The method of claim 9, wherein said one or more encoding bit rate comprises at least one bit rate at or below 500 kbps and one bit rate at or greater than 1200 kbps.

13. The method of claim 9, wherein said encoded content includes advertising content, wherein insertion of said advertising content is controlled via said content live streaming platform.

14. The method of claim 9, further comprising the steps of:
   identifying a natural break event in said event content; and
   inserting said advertising content at said natural break event in said event content.

15. The method of claim 9:
   wherein the encoded content includes one or more start triggers that identify a location in the encoded content where the content distribution network may insert advertising content and one or more stop triggers that identify a location in the encoded content where the content distribution network will stop inserting advertising content and resume distribution of the encoded content, and the start triggers, and
   wherein the stop triggers are inserted into said encoded content via said content live streaming platform.

16. The method of claim 9, further comprising the steps:
   distinguishing users based on subscription type,
   wherein said encoded content comprises a plurality of content stream types; and
providing users access to a content stream type selected from said plurality of content stream types based on said subscription type.

* * * * *